United States Patent [19]

Järund

[11] Patent Number: 4,684,018
[45] Date of Patent: Aug. 4, 1987

[54] THERMOMETER SHEATH

[75] Inventor: Erik Järund, Fjällbacka, Sweden

[73] Assignee: Devello AB, Fjällbacka, Sweden

[21] Appl. No.: 870,649

[22] Filed: Apr. 30, 1986

Related U.S. Application Data

[63] Continuation of Ser. No. 598,843, Apr. 10, 1984, abandoned.

[30] Foreign Application Priority Data

Apr. 15, 1983 [SE] Sweden ................... 8302099

[51] Int. Cl.$^4$ ............................................. B65D 85/38
[52] U.S. Cl. ................................... 206/306; 206/820; 374/158; 383/35
[58] Field of Search ............... 206/306, 363, 370, 459, 206/466, 820, 822; 383/5, 33, 35, 119; 374/158, 209

[56] References Cited

U.S. PATENT DOCUMENTS

| Re. 25,694 | 12/1964 | Nichols | 383/35 |
|---|---|---|---|
| 2,902,146 | 9/1959 | Doherty | 206/459 |
| 3,160,273 | 12/1964 | Reuther et al. | 206/820 |
| 3,179,327 | 4/1965 | Burton et al. | 206/459 |
| 3,235,063 | 2/1966 | Järund . | |
| 3,246,739 | 4/1966 | Sable | 206/820 |
| 3,396,836 | 8/1968 | Cook | 206/820 |
| 3,406,853 | 10/1968 | Martine et al. | 383/33 |
| 3,416,651 | 12/1968 | Järund | 206/306 |
| 3,759,370 | 9/1973 | Blatz | 206/306 |
| 4,051,950 | 10/1977 | Järund . | |
| 4,136,776 | 1/1979 | Poncy | 206/306 |
| 4,164,285 | 8/1979 | Dorman | 206/306 |
| 4,165,000 | 8/1979 | Poncy | 206/306 |
| 4,278,198 | 7/1981 | Norton et al. | 383/119 |
| 4,363,345 | 12/1982 | Scheibner | 383/35 |
| 4,614,442 | 9/1986 | Poncy | 374/158 |

Primary Examiner—Stephen Marcus
Assistant Examiner—David T. Fidei
Attorney, Agent, or Firm—Brumbaugh, Graves, Donohue & Raymond

[57] ABSTRACT

A thermometer sheath in a multiple pack comprising a continuous support foil (1) of paper on which a lower and an upper plastic foil (2 and 3) are placed, whereby the plastic foils (2, 3) are welded together and the lower plastic foil (2) is releasably attached to the support foil (1) by means of a heat sealing line (4), which delimits a number of case-shaped thermometer sheaths closed at one end, which are detachable from each other and from the support foil (1), and whereby the lower plastic foil (2) is longer than the upper plastic foil (3) thus that a flap is formed at the case orifice. A stiffening strip (5) of plastic material is positioned between the upper and the lower plastic foil (2 and 3) transversally to the longitudinal direction of the case and attached to said plastic foils (2, 3) by two opposite parts (4',4") of the heat-sealing line (4), whereby the stiffening strip (5) extends beyond the end of the upper plastic foil (3).

4 Claims, 3 Drawing Figures

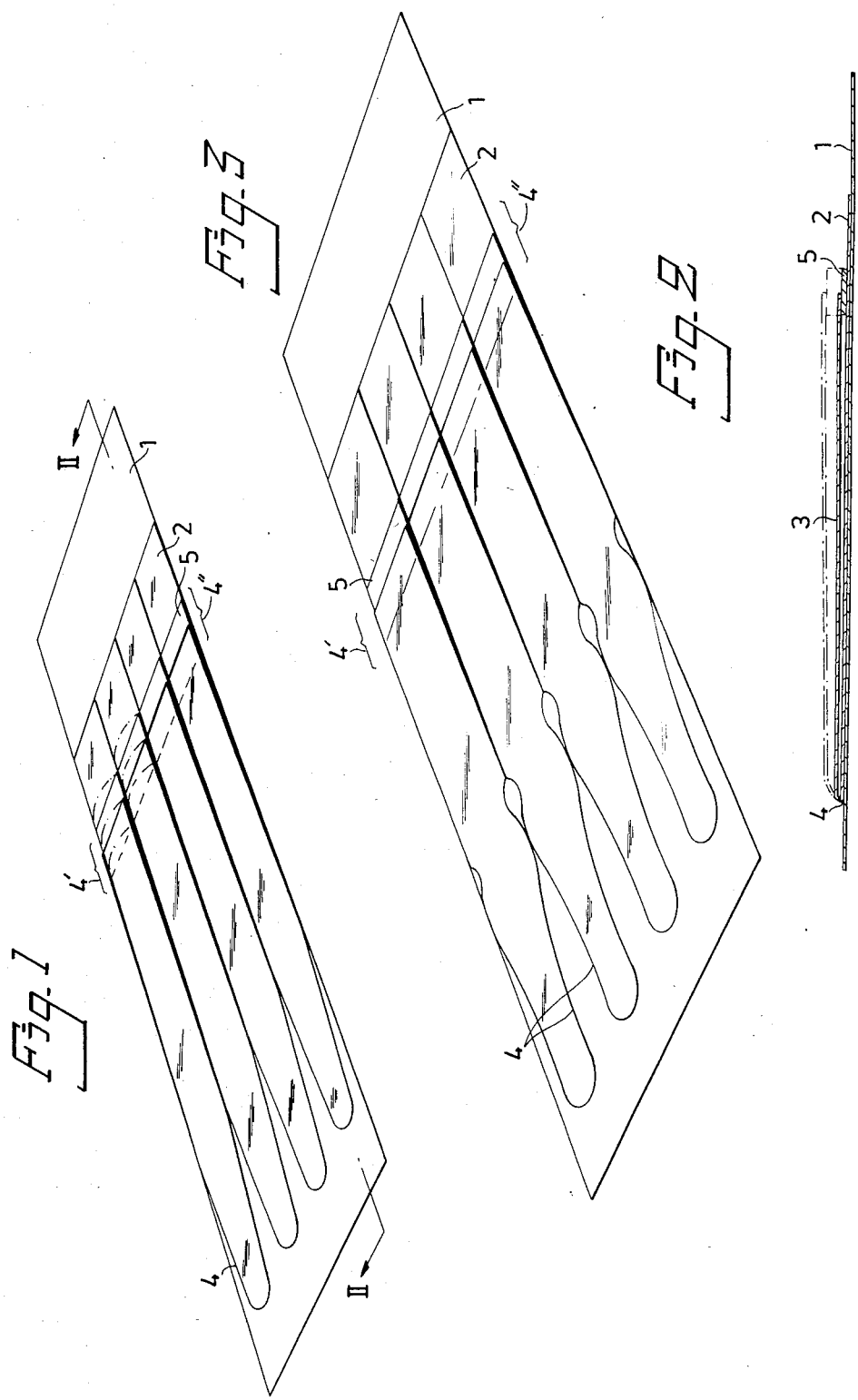

THERMOMETER SHEATH

This application is a continuation of application Ser. No. 598,843, filed on Apr. 10, 1984, now abandoned.

BACKGROUND OF THE INVENTION

The present invention is related to a thermometer sheath in a multiple pack comprising a continuous support foil of paper on which a lower and an upper plastic foil are placed, whereby the plastic foils are welded together and the lower plastic foil is releasably attached to the support foil by means of a heat-sealing line, which delimits a number of case-shaped thermometer sheaths closed at one end, the thermometer sheaths are detachable from each other and from the support foil, since the lower plastic foil is longer than the upper foil, a flap is formed at the case orifice.

A multiple pack of thermometer sheaths of this kind is known from example U.S. Pat. No. 3,235,063. In this known multiple pack, each thermometer sheath has a pulling strip arranged between two plastic foils. This pulling strip is welded together with the plastic foils in the closed end of the sheath and extends in the longitudinal direction at a distance out of the orifice of the case, and functions partly to facilitate the introduction of a thermometer into the case, and partly to facilitate the turning inside out of the sheath at the removal of the thermometer therefrom. Further, the upper plastic foil is provided with a slit from the case orifice in the longitudinal direction to less than half the length of said case, as a further measure to facilitate the inversion of the sheath. The design as a multiple pack with adjacent cases provide the advantage of little loss of material.

Primarily through the occurence of the pulling strip production of the known multiple pack will be relatively complicated. While the paper and plastic foils can be fed from continuous bands (lines) in a common running direction, the pulling strip is formed from a strip band (line) thereby that the cutting and feeding device feeds the end of the strip band to sufficient length transverse to other bands in between the bands of plastic foil, whereafter the strip band is cut to the desired strip length and the cutting and feeding device returns to feeding another strip band end in between the bands of plastic foil. To keep the strip in a correct position until it is welded to the plastic foils, the main cylinder where the paper and plastic foil bands are brought together, has arranged therein openings which are connected to a vacuum equipment whereby the strip is sucked to adhere against the main cylinder.

SUMMARY OF THE INVENTION

A further substantial drawback with this known pack of thermometer sheaths is that the user often misunderstands the function of the strip and uses it in a wrong way.

According to the present invention it has now been provided a thermometer sheath which is technically substantially more simple to produce than the known multiple pack sheaths and in spite of the non-existence of a pulling strip can be turned inside out on removal of the thermometer.

This has been achieved by a thermometer sheath, which is of the kind mentioned by way of introduction and characterized in that a stiffening plastic strip is positioned between the lower and the upper plastic foils transverse to the longitudinal direction of the case and attached to said plastic foils by opposite parts of the heat-sealing line, whereby the stiffening strip extends beyond the end of the upper plastic foil.

BRIEF DESCRIPTION OF THE DRAWINGS

FIG. 1 shows a perspective view of a first embodiment of a band-shaped multiple pack of thermometer sheaths according to the invention, FIG. 2 shows a section II—II of the multiple pack according to FIG. 1.

FIG. 3 shows a perspective view of a second embodiment of a band-shaped multiple pack of thermometer sheaths according to the invention.

DESCRIPTION OF THE ILLUSTRATED EMBODIMENT

The multiple pack of thermometer sheaths shown in the drawings comprises a support foil 1 of paper on which a lower plastic foil 2 and an upper plastic foil 3 are placed. The two plastic foils 2 and 3 are welded together by means of a heat-sealing line 4. Further the lower plastic foil 2 is releasably attached to the support foil 1 by means of said heat-sealing line 4, which delimits a number of case-shaped thermometer sheaths closed at one end, which are detachable from each other and from the support foil. The lower plastic foil 2 in this case is slightly longer than the upper plastic foil 3, thus a flap is formed at the orifice of the case. Between the two plastic foils 2 and 3 a stiffening strip 5 of plastic is positioned transverse to the longitudinal direction of the case. The stiffening strip 5 is attached to the plastic foils 2 and 3 by two opposite parts 4' and 4" of the heat-sealing line 4 and extends beyond the end of the upper plastic foil 3. At this projecting portion the stiffening strip 5 is only attached to the lower plastic foil 2, which here and along the other longitudinal edge of the flap is releasably attached to the paper foil by parts of the heat-sealing line 4. The stiffening strip 5 is manufactured of a plastic strip with a greater thickness than the thickness of the foils 2 and 3 and thereby a greater stiffness. While the foils 2 and 3 are transparent to enable reading of the thermometer the stiffening strip 5 is preferably made of opaque or coloured plastic to make the orifice of the case more clearly visible.

Preferably the stiffening strip 5 projects beyond the upper foil 3 to about half its width and to $\frac{1}{8}$-$\frac{1}{3}$, preferably 1/6-$\frac{1}{4}$, of the length of the flap. A suitable width of the strip 5 is about 8–14 mm, preferably about 10 mm.

Dashed lines in FIG. 1 and 2 show how the stiffening strip and in FIG. 2 the upper plastic foil 3 are bent up from the lower plastic foil 2 on introduction of a thermometer into the case. The case formed of the plastic foils 2 and 3 can thereafter simply be released from the support foil 1 for example by grasping the free end of the thermometer with one hand and the support foil 1 at the closed end of the case with the other hand and pulling to release the support foil 1 starting from said closed end.

The embodiment according to FIG. 3 is different from that of FIG. 1 and 2 by giving the sheath a different profile. The labels given in the embodiment of FIG. 3 have been given the same descriptions as the labels of the embodiments of FIGS. 1 and 2.

The thermometer sheath according to the invention is manufactured in a conventional manner by putting together continuous bands of material to a multilayer band, which is introduced between a combined heat-sealing and punch back and a support, whereafter the back is brought to contact and pressing against the multi-layer band to form the casing for the thermometer, whereafter the excess material after the heat-sealing is removed. As shown in FIGS. 1 and 3 the bringing together of the material band for the stiffening strip with other material bands in the multi-layer band can be done in an analogous manner with the putting together of the other bands, and it does not require an equipment so complicated as that which is used to position the pulling strip in a thermometer sheath according to U.S. Pat. No. 3,235,063 in the required position.

On removal of the thermometer out of the thermometer sheath one grasps the upper end of the thermometer with one hand and the flap formed of the foil 2 with the other hand and pulls the flap along the thermometer. Hereby the sealingline between the foil 2 and the strip 5 is divided at least on one side thus that the strip is folded out and can be turned and the sheath may be turned inside out on removal, in spite of the narrow orifice.

To facilitate the removal by turning inside out the sheath is preferably made with a profile which makes the sheath tightly enclose either the tip of the thermometer or the shoulder thereof. In this way the sheath is held more firmly to the thermometer on turning off.

I claim:

1. A cartridge like multiple pack of thermometer sheaths comprising a plurality of such sheaths having:
    a continuous support foil of paper with a top edge and a bottom edge,
    a first thin plastic foil on said support having a top edge lying adjacent and substantially parallel to the top edge of said support and a plurality of toe portions extending towards said bottom edge,
    a second thin plastic foil overlying said first plastic foil, said second foil having a top edge displaced from and parallel to the top edge of said first foil and a plurality of toe portions extending toward the bottom edge of said support and substantially overlying toe portions of said first foil,
    a plurality of heat-seal lines transverse to the top edges of foils and support which define sides between adjoining thermometer sheaths, which also extend around and join the toe portions of said toe foils, which heat seals are effective to form severable lines between adjoining sheaths and which also serve to adhere said foils to the support foil along the line defining the side edges and toe portions of the thermometer sheaths,
    the displacement of the top edge of said second foil relative to the top edge of said first foil being sufficient to define an opening between said foils for insertion of a thermometer, said displacement further leaving a portion of top edge of the first plastic foil extending beyond the top edge of said second foil, thereby forming a flap to facilitate insertion of said thermometer, and
    a plastic stiffening strip between said first and second foils below the top edge of said second foil and running substantially parallel to the top edges of said plastic foils and support, said strip being bendable and having the ability to keep said first and second foils separated, a portion of said strip extending above the top edge of said second foil and below the top edge of said first foil and a portion of said strip extending below said top edge of said second foil, said strip being sealed in place between said first and second foils by the sealing lines which seal the entire strip to said first foil and the entire portion of the strip extending below the top edge of said second foil to the second foil, said strip being effective to facilitate insertion of a thermometer into a sheath within said cartridge-like pack.

2. A thermometer sheath pack according to claim 1 characterized in that the profile of each sheath is such that it tightly encloses the tip of the thermometer shoulder of the thermometer.

3. A thermometer sheath pack according to claim 1 characterized in that the stiffening strip projects beyond the upper foil to about half the width thereof.

4. A thermometer sheath pack according to claim 1 characterized in that the stiffening strip extends from the upper foil to about ⅛-⅓, preferably 1/6-¼ of the length of the flap.

* * * * *

UNITED STATES PATENT AND TRADEMARK OFFICE
CERTIFICATE OF CORRECTION

PATENT NO. : 4,684,018
DATED      : August 4, 1987
INVENTOR(S) : Erik Järund

It is certified that error appears in the above-identified patent and that said Letters Patent is hereby corrected as shown below:

Col. 1, line 15, ", the" should read --.  The--;
Col. 1, line 16, ", since" should read --.  Since--;
Col. 1, line 20, after "from" insert --for--;
Col. 1, "SUMMARY OF THE INVENTION" should be deleted following line 51, and inserted following line 57;
Col. 4, line 33, after "thermometer" insert --or the--;
Col. 4, line 38, "claim 1" should read --claim 3--.

Signed and Sealed this

Twenty-ninth Day of December, 1987

Attest:

DONALD J. QUIGG

Attesting Officer         Commissioner of Patents and Trademarks